May 5, 1925.
W. F. REULMAN
INTERCHANGEABLE STUD DRIVER
Filed Aug. 24, 1922
1,536,309
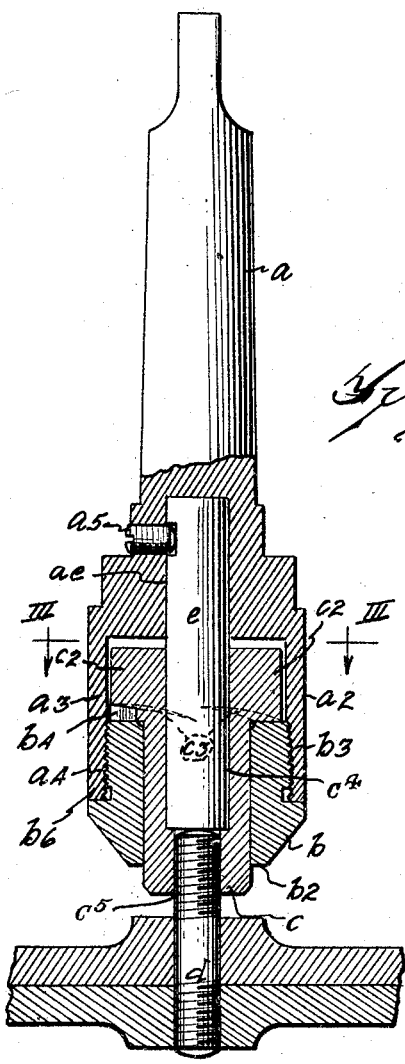
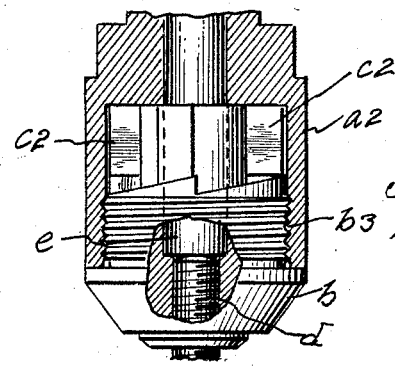
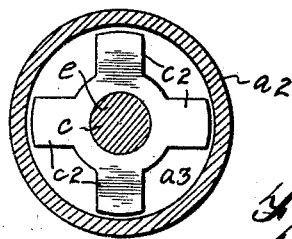
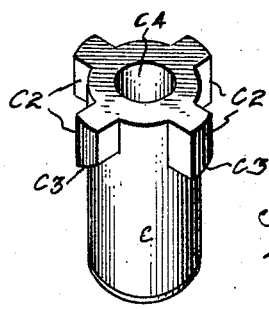
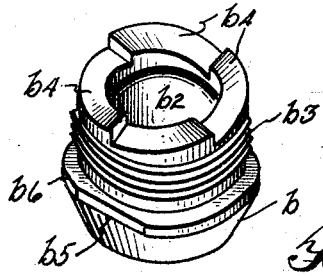
Inventor
William F. Reulman
By Ralgemond A. Parker
Attorney Patented May 5, 1925.

1,536,309

UNITED STATES PATENT OFFICE.

WILLIAM F. REULMAN, OF DETROIT, MICHIGAN.

INTERCHANGEABLE STUD DRIVER.

Application filed August 24, 1922. Serial No. 583,985.

*To all whom it may concern:*

Be it known that I WILLIAM F. REULMAN, a citizen of the United States, residing at Detroit, county of Wayne, State of Michigan, have invented a certain new and useful Improvement in Interchangeable Stud Drivers, and declare the following to be a full, clear, and exact description of the same, such as will enable others skilled in the art to which it pertains to make and use the same, reference being had to the accompanying drawings, which form a part of this specification.

My invention relates to stud drivers and an object of my improvements is to provide an improved tool for setting studs in place that shall set the stud as tight as desired and then easily release the driver from the stud.

In the accompanying drawings,—

Figure 1 is an elevation of a tool embodying my invention, partly broken away to show the interior construction;

Fig. 2 is a similar view of the lower end of said tool, the parts being in an alternative position and some parts that are shown in section in Fig. 1 are shown in full, and broken away;

Fig. 3 is a section on the line 3—3 of Fig. 1;

Fig. 4 is a perspective view of the stud-holder; and

Fig. 5 is a perspective view of the adjustable collar forming the end of the tool.

$a$ is a tool-holder having at its upper end a conical shank adapted to engage in the socket of the live-head of a machine tool. The lower end of the tool-holder $a$ is enlarged at $a^2$ and provided with a concentric cylindrical opening $a^3$ open at its lower end. The lower portion of the wall of said opening is screw-threaded as $a^4$.

$ae$ is a cylindrical cavity of smaller diameter than the opening $a^3$ and forming a co-axial upper continuation of said opening. $e$ is a cylindrical pin fitting into the opening $ae$ and held therein by a set-screw $a^5$ engaging through the wall of the tool $a$.

$c$ is a cylindrical stud-holder. This has a screw-threaded concentric cylindrical opening $c^5$ at its lower end adapted to engage the screw-threaded end of the stud. There is a concentric cylindrical opening $c^4$ in said stud-holder of larger diameter than, and forming an upward extension of the opening $c^5$. $c^2$, $c^2$ indicate wings or lugs extending radiallly outward from the upper end of the stud-holder $c$, their outer ends being adapted to fit within the opening $a^3$. The lower edges of the lug $c^2$ are formed into cam surfaces $c^3$. The pin $e$ engages in the aperture $c^4$ to guide and fix the stud-holder $c$ in position in the aperture $a^3$ of the tool-holder, as shown distinctly in Fig. 1.

$b$ is a collar having screw-threads $b^3$ on its outer surfaces adapted to engage the screw-threads $a^4$ in the cavity of the tool-holder and provided with a shoulder $b^6$ adapted to engage against the lower edge of the wall of the tool-holder $a$ to limit the inward motion of said collar. The bore $b^2$ of the collar $b$ fits around the outer wall of the stud-holder $c$. The upper edge of the collar $b$ is provided with cam faces $b^4$ corresponding and adapted to co-act with the cam faces $c^3$ on the lower ends of the lug $c^2$.

$d$ represents a stud and is shown as adapted to secure two contiguous plates together, the stud engaging in the lower plate and being adapted to receive a nut to engage over the upper plate.

The operation of the above-described device is as follows: The parts being adjusted to position, as shown in Fig. 1 and described, the tool-holder is fixed in a live-head by inserting its conical shank in the cavity of said head in the usual way. The stud is inserted in the opening in the lower plate by hand and given a few turns. The tool is then brought over the upper end of said stud and the live-head set in rotation in a positive direction, thus screwing the shank of the stud $d$ up into the cavity $c^5$ of the stud-holder. At the same time the cam faces $b^4$ are moved along the cam faces $c^3$, thus drawing the tool-holder $c$ upward until the upper end of the stud $d$ engages against the lower end of the pin $e$ (Fig. 2) or the upper end of said holder against the upper end of the cavity $a^3$ in which latter case, of course, the stud will be drawn against the end of the pin $e$ by further rotation. Continued rotation of the live-head now drives the stud $d$ firmly into position and fixes it there.

When the live-head is reversed the cam faces $b^4$ turn relative to the cam faces $c^3$, thus releasing the engagement of said cam surfaces, the vertical face of the lugs $c^2$ engaging against the vertical surfaces between two cam faces $d^4$. This reverse movement also disengages the pins $d$ and $e$. Continued reverse motion of the live-head then unscrews the holder from the stud $b$ and disengages the tool from said stud.

The engagement of the cam faces $b^4$ and $c^3$ holds the stud firmly in place for the setting operation. The disengagement of these cam faces obviates any friction at the commencement of the releasing movement of the tool.

A number of stud-holders $c$ having different size apertures $c^5$ will be used with the same tool to adapt the tool to the driving of different sized studs.

What I claim is:

1. In a stud driver, a shank member having a cavity to receive a stud holder, a stud-holder supported within said cavity and having laterally-extending parts at its upper end, said laterally-extending parts being provided with cam surfaces at their lower edges, said holder being provided with a screw-threaded aperture at its outer end adapted to engage the screw-threaded end of a stud, a collar surrounding said stud-holder and closing the outer end of said cavity, the upper edges of said collar being provided with cam surfaces adapted to co-act with the cam surfaces on the laterally-extending parts of the stud-holder to releasably lock the stud-holder to the shank member.

2. In a stud driver, a shank member having a cavity capable of receiving stud holders of different size, a stud holder receivable within said cavity, means removably supporting said stud holder within said cavity, co-acting cam surfaces on said means and on said stud holder to releasably lock the stud holder to the shank member upon rotation of the shank member in a given direction.

3. In a stud driver, a shank member, a stud-holding member, one of said members having an end cavity to removably receive the other member, an annular part detachably engaged within the cavity of the one member surrounding the other member to hold the same within said cavity and having an inclined face co-acting with an inclined face on the member it surrounds to move the same endwise upon relative rotation of the members in a given direction to lock the members together.

4. In a stud driver, a shank member having a cavity capable of receiving stud-holding members of different size, a pin axially supported within the said cavity, a stud holder removably supported within the cavity surrounding said pin, means surrounding said stud holder to support the same within the cavity for limited movement therein, co-acting cams on said means and on said stud holding member whereby said holding member is caused to move endwise within the cavity into a locked position with the shank member upon rotation of such shank member in a given direction.

5. In a stud driver, a shank member having a cavity at one end, a stud holder mounted therein for relative axial movement but held against relative radial displacement, an apertured plug detachably threaded into the end of said cavity surrounding said stud holder to hold the same within the cavity, said plug provided on its inner end with cam surfaces, said stud holder provided with co-acting cam surfaces engaging the cam surfaces of the plug.

6. In a stud driver, a shank member having a cavity at one end, a pin extending axially within said cavity, a stud holder receivable within said cavity provided with an axial passageway threaded at its outer end, said stud holder slidably mounted upon said pin so the pin extends into the opposite end of the axial passageway within the stud holder, an annular part detachably engaged within the cavity of a shank member surrounding said stud holder having an inclined face co-acting with an inclined face on the stud holder to move the stud holder endwise within the cavity in the shank upon rotation of said shank relative to said stud holder.

In testimony whereof, I sign this specification.

WILLIAM F. REULMAN.